United States Patent [19]

Grotjohann et al.

[11] 4,288,868
[45] Sep. 8, 1981

[54] SATELLITE COMMUNICATION SYSTEM FOR SPEECH AND TELEGRAPHY

[75] Inventors: Hermanus H. Grotjohann; John R. Reynders, both of Hilversum, Netherlands

[73] Assignee: U.S. Philips Corporation, New York, N.Y.

[21] Appl. No.: 47,612

[22] Filed: Jun. 11, 1979

[30] Foreign Application Priority Data

Jun. 20, 1978 [NL] Netherlands .......................... 7806618

[51] Int. Cl.³ .............................................. H04L 5/18
[52] U.S. Cl. ....................................... 370/30; 370/31; 370/104; 370/110
[58] Field of Search ..................... 370/30, 31, 55, 104, 370/110, 111; 455/12, 13, 31

[56] References Cited

U.S. PATENT DOCUMENTS

| | | | |
|---|---|---|---|
| 2,600,226 | 6/1952 | Ensink | 370/71 |
| 3,517,312 | 6/1970 | Yamato | 370/104 |
| 3,564,147 | 2/1971 | Puente | 370/104 |
| 3,958,083 | 5/1976 | Hara | 370/104 |
| 3,982,075 | 9/1976 | Jefferis | 370/104 |
| 4,069,392 | 1/1978 | Goldenberg | 370/30 |

*Primary Examiner*—David L. Stewart
*Attorney, Agent, or Firm*—Thomas A. Briody; William J. Streeter; Edward W. Goodman

[57] ABSTRACT

Satellite communication system for speech signals located within the telephony band and one or more data signals, wherein half-duplex data traffic between ground-based stations can be effected simultaneously with, but separated from, full-duplex speech traffic between two ground-based stations. The use of a second receiver enables all ground-based stations to follow both the data traffic and the speech traffic.

4 Claims, 4 Drawing Figures

SATELLITE COMMUNICATION SYSTEM FOR SPEECH AND TELEGRAPHY

BACKGROUND OF THE INVENTION

The invention relates to a communication system for the transmission on a telephony channel of speech signals located within a speech band as well as at least one data channel comprising data signals modulated on a carrier located within a data band which is outside the speech band, the system comprising at least three stations, each station including a transmitter and a receiver which each operate at a mutually different frequency—belonging to a frequency pair—for half-duplex data communication combined with full-duplex speech communication.

Such a communication system is generally known and is, for example, suitable for use for service purposes in a satellite communication system.

CCITT recommendation H 34 describes how for combined telephone and telegraph communication the telephone channel is divided into a speech band and a plurality of data channels forming a data band.

In addition, it is known that a communication system for combined data and speech communication operates on one frequency pair. In such a system a station transmits on a first frequency and receives on a second frequency, whereas a second station receives on the first frequency and transmits on the second frequency. The communication between two stations belonging to the group is either done through wires or may be done by means of radio communication; in the latter case, for example by way of a satellite. The communication through the data band is restricted to half-duplex, when it is assumed that, in order to be able to receive the data signals transmitted by a station at all the other stations, the frequency of the receivers in all the other stations must be equal to the frequency of the transmitted signal. Thus, it is not possible for a second station to operate simultaneously in the same mode on the second frequency as the receivers of the remaining stations are tuned to the first frequency. Full-duplex communication over the speech band is only possible between two stations which belong to the group. The other stations receive only the speech signal from one of the two stations.

A special problem is encountered in the combined communication of speech and data. If, namely, a first station transmits on the first frequency and receives on the second frequency, whereas a second station transmits on the second frequency and receives on the first frequency, all the other stations also receive on the first frequency. However, when the first station stops the supply of data before the speech connection is broken, the data supply of the second station cannot be transmitted because the other stations, since they receive on the first frequency, would not receive these data. The consequent waiting times may be considerable.

SUMMARY OF THE INVENTION

It is an object of the invention to provide a communication system for combined speech and data communication which has a high degree of flexibility and in which said drawbacks are obviated.

According to the invention this is accomplished by providing the station with a second receiver having a receive frequency which corresponds to the frequency of the transmitter of that station.

A first advantage of the measure according to the invention is that the entire conversation between the two transmitting stations can be followed by the other stations. A second advantage is that each station is capable of transmitting data if the data band is not being used and that all other stations can receive these data, thus minimizing waiting times.

Further measure according to the invention is characterized in that for the transmission of control signals for the communication system the station comprises a service channel within the said telephone channel, which service channel is modulated on a sub-carrier frequency. The advantage of this measure is that commands, such as, for example, the interchanging of transmit and receive frequency can be transmitted through the channel incorporated in the system.

In the case of communication between a group of stations by way of a satellite it is of importance to limit not only the power consumed by the stations but also the power consumed by the satellite. In accordance with a further measure according to the invention this is accomplished by providing the station with means for making the transmitter inoperative in the absence of speech and data signals. This also achieves that the frequency band is used efficiently.

In a further measure according to the invention the communication system is provided with a data modulator/demodulator coupled to the transmitter and the receiver and characterized in that the data modulator/demodulator comprises means for keeping the data modulator in the disabled state when the data demodulator is in operation. By means of this measure it is prevented that two transmitting stations perform data communication in full-duplex, as it is assumed that other stations cannot process more than one data signal at a time.

A further measure according to the invention is characterized in that the data modulator/demodulator of the station comprises means for making the data modulator/demodulator inoperative in the absence of data to be transmitted. By means of this measure the non-modulated subcarrier is prevented from making the transmitter operative or from keeping the transmitter operative, as the case may be.

DESCRIPTION OF THE DRAWINGS

The invention and its advantages will be explained in greater detail with reference to the Figures, corresponding elements having been given the same reference numerals.

DESCRIPTION OF THE PREFERRED EMBODIMENT

Figure 1:
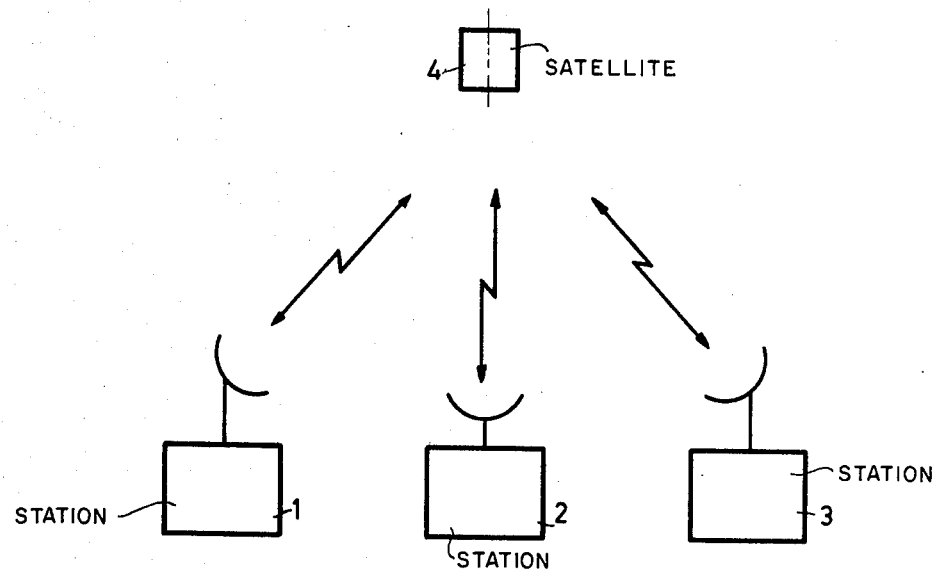
FIG. 1 shows a block diagram of an embodiment of a system of communication via a satellite according to the invention.

FIG. 1 shows a system for satellite communication in accordance with the invention between a number of stations 1, 2 and 3 through a satellite 4. The Figure shows the minimum number of stations- namely three. However, the system may comprise any larger number of stations. For a communication system according to the invention it is not essential for the communication to be done via a satellite. Other fully intermeshed radio or wire networks can be utilized for a communication system in accordance with the invention.

The communication between the stations 1, 2 and 3 is done on frequencies which form a so-called frequency pair. This means that in the case of speech transmission between, for example, stations 1 and 2, station 1 transmits on a first frequency, for example $f_o$ and receives on a second frequency, for example $f'_o$ and that station 2 transmits on the second frequency $f'_o$ and receives on the first frequency $f_o$. It is possible to allot two or more frequency pairs to a few or to all stations. Thus, when, for example, four frequency pairs are simultaneously utilized, the communication system will be divided into four subsystems. In general, the communication between stations belonging to different subsystems is then out of the question. However, the combined communication of speech and data can be performed in accordance with the invention within each subsystem. For the sake of simplicity the following description will be based on a communication system having only one frequency pair $f_o - f'_o$.

Figure 2:
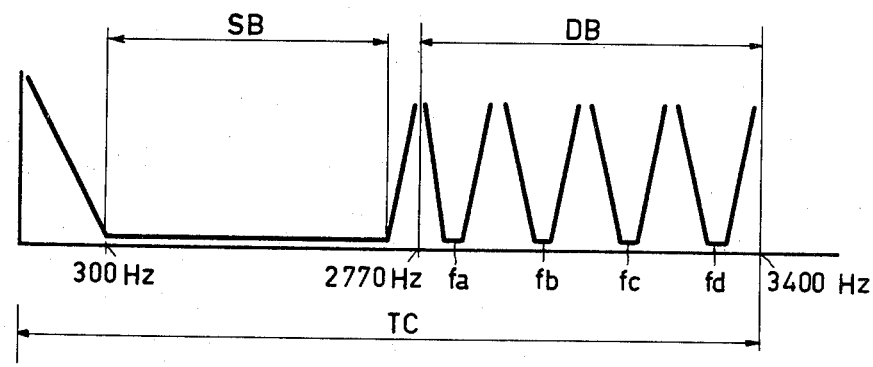
FIG. 2 shows a possible position of a speech band and a number of data channels within a telephone channel for a satellite communication system as shown in FIG. 1.

For the transmission of speech and data within a telephone channel, use is made of a subdivision of the telephone channel as described in CCITT "Recommendation H 34". FIG. 2 shows a specific implementation on the basis of the recommendation. The speech band SB is situated in the frequency range from 300-2700 Hz, while the data band DB covers the range from 2770-3400 Hz. One or more data channels can be accommodated in the data band DB. FIG. 2 shows schematically how a speech band SB and four data channels situated around the sub-carrier frequencies $f_a$, $f_b$, $f_c$ and $f_d$ can be arranged in a telephone channel TC. For the sake of simplicity the description will only deal with a data band having two data channels. Although in the described embodiment according to the invention the data band is situated above the speech band it is, however, alternatively possible to situate the data band for example, below the speech band SB, i.e. below 300 Hz.

Figure 3:
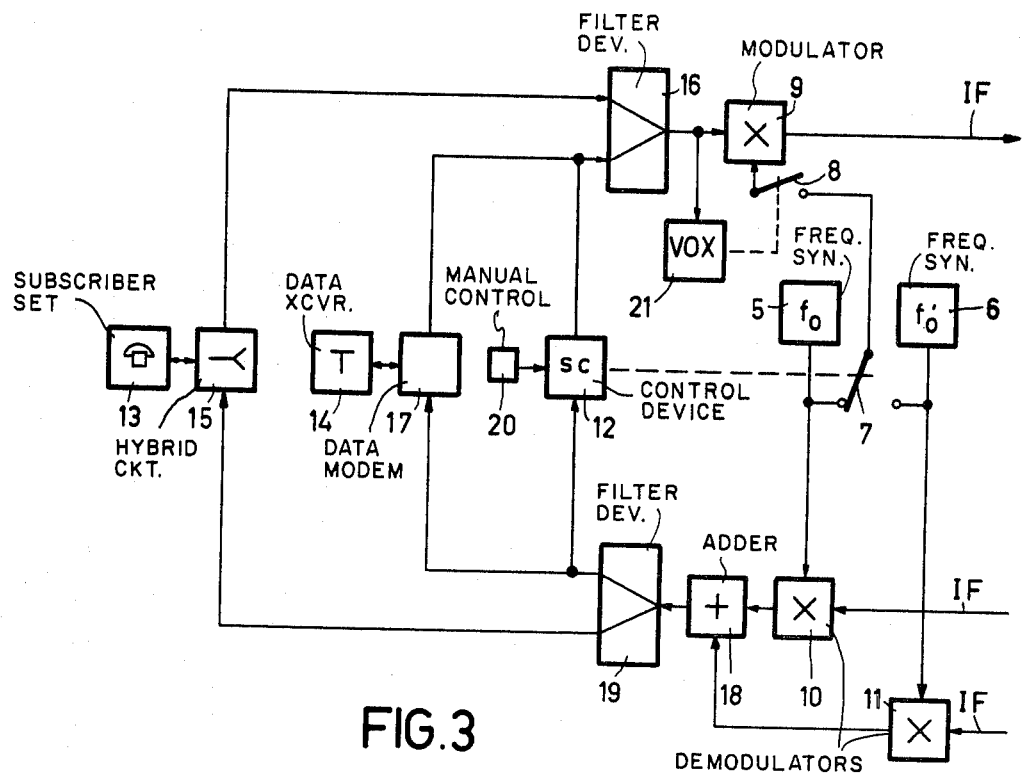
FIG. 3 shows a block diagram of an embodiment of a station used in a communication system of FIG. 1.

FIG. 3 shows a block diagram of an embodiment of a station for use in a satellite communication system according to the invention. Therein reference numerals 5 and 6 are frequency synthesizers, known per se, for generating the frequency $f_o$ and $f'_o$, respectively. The frequencies $f_o$ and $f'_o$ together constitute a frequency pair. When a changeover switch 7 is in the position shown frequency $f_o$ is applied through switch 8 to a modulator 9 which forms part of a transmitter, not shown. In addition, the frequency $f_o$ is applied to a first demodulator 10 which forms part of a receiver of the station. When switch 7 is switched to its second position frequency $f'_o$ is applied to the transmitter.

The change-over switch 7 is controlled by a control device 12 in a manner which will be described in the further course of this description. The control of the change-over switch 7 by the control device 12 is schematically shown in the Figure by means of a dashed line.

The signal to be modulated on the frequency $f_o$ or $f'_o$ is supplied by a subscriber's set 13 and/or a data transceiver 14, which may be a telex set in particular. The speech signal supplied by subscriber's set 13 is applied to a first filter device 16 through a hybrid circuit 15, whereas the data signal, generated by 14, is applied to another input of filter device 16 through a data modulator/demodulator 17. Filter device 16 has for its function to limit the speech signal to a speech band as, for example, shown in FIG. 2 and to limit the data signal to the desired data band and to combine the filtered signals. The signal supplied by filter device 16 is applied to modulator 9. The modulated signal—shown in FIG. 3 as IF signal—will then be transmitted (on frequency $f_o$ or $f'_o$) through a transmitter, not further shown.

The signal supplied by filter device 16 is also applied to a voice activated carrier control network 21, VOX-network for short, to determine the control of switch 8. The control of switch 8 by VOX-network 21 is shown schematically in FIG. 3 by means of a dashed line.

In accordance with the invention a station is provided with a second receiver, shown in FIG. 3 as a second demodulator 11, which is tuned to a receiving frequency which corresponds to the frequency of the transmitter of that station. The advantage thereof is that the signals transmitted by other receivers on both the frequencies $f_o$ and $f'_o$ can be received by each station and that these signals can be detected via the first demodulator 10 and the second demodulator 11 and in combination with the frequency $f_o$ and $f'_o$ already available in the station.

The signals supplied by, possibly, both the demodulators 10 and 11 are applied to adder 18. The signal supplied by adder 18 is applied to a second filter device 19. Filter device 19 has for its object to separate the speech signal and one or more data signals from one another. The speech signal is applied to subscriber's set 13 through hybrid circuit 15 and the data signals are supplied to the data transceiver 14 through data modulator/demodulator 17.

In addition, a data channel in the data band is reserved for transmitting and receiving control signals for the communication system itself. The information which is transmitted over this channel, which is called the service channel in the further course of the description, relates to, for example, frequency allotment, inhibiting etc. To this end control device 12 is coupled to the first filter device 16 and to the second filter device 19. Information supplied by the present station is applied to the modulator 9 of the transmitter over the service channel by the first filter device 16 while information of other stations are transferred to control device 12 through one of the receivers and by the second filter device 19. The control device 12 is further coupled to a manual control device 20 whose function it is to influence control device 12 of the station concerned.

The communication system operates as follows. In the idle mode of the system all transmitters are inactuated because switch 8 is open under the control of VOX-network 21. In the absence of any signal above a certain threshold value at the input of VOX-network 21 switch 8 is opened which prevents a non-modulated (carrier) frequency from being transmitted. This has the advantage that the consumed power is limited because the smallest possible number of channels is used at any moment.

In the case of a call by, for example, station 1 in FIG. 1 control device 12 is activated in station 1 by means of manual control device 20. The function of manual control unit 20 can be fulfilled by the hook contact of the subscriber's set 13, both when a call is coming through and on termination of a conversation. Control device 12 switches change-over switch 7 to the position not shown in the drawing (the second position), locks it in this position and a call signal is applied to filter device 16 through the service channel. This signal is applied to the VOX-network 21 and to modulator 9 which is activated because switch 8 is moved to the position not shown in the drawing by means of the VOX-network. The call may be collective, in which case all stations are called or selective, in which case only one selected station is called. However, in both cases the transmitted frequency of all stations (station 1 excepted) is locked by the control device 12 at $f_o$ by means of change-over switch 7 to prevent the possibility that these stations utilise the frequency $f'_o$ so that two stations would transmit on the same frequency. (Occasionally data communication must be given priority over speech communication. To meet this requirement said locking can be eliminated and the conversation in progress can be continued, possibly in simplex mode). If, for example, station 2 of FIG. 1 answers the call by having control device 12 offer a reply signal to filter device 16 via the service channel, a full-duplex speech communication can take place between stations 1 and 2, station 1 transmitting on $f'_o$ and receiving on $f_o$ and station 2 transmitting on $f_o$ and receiving on $f'_o$. The reply signal transmitted by station 2 has further for its result that control device 12 in each of the other stations transmits a blocking signal to the network via the service channel so that switch 8 is locked in the position shown in the drawing. This achieves that the remaining stations have an indication that none of the frequencies $f_o$ or $f'_o$ is available. The advantage of providing the stations in accordance with the invention with two receivers is that the other stations, such as, for example, station 3 in FIG. 1, can follow the conversation in full. If both stations 1 and station 2 transmit speech simultaneously the other stations receive these two stations simultaneously. This renders it possible for the other stations to follow the conversation between stations 1 and 2 in full.

At the end of the conversation two possibilities may occur, namely station 1 finishes the conversation first or station 2 finishes the conversation first. In the case station 1 finishes the conversation first control device 12 is activated in this station 1 through manual control unit 20. An end-of conversation signal is transmitted of $f'_o$ through the service channel. On receipt of this signal the locking of switch 8 by the VOX-network 21 is eliminated in all stations (stations 1 and 2 excepted) and also the locking of the transmitted, frequency on $f'_o$ is eliminated. In station 1 the control device 12 moves the change-over switch 7 to the first position (the position shown in the drawing) again. Finally, the end-of-conversation signal 1 is made audible in the subscriber's set in station 2. Station 2 breaks the connection by eliminating the locking of the change-over switch 7 by means of the manual control unit 20 and the control device 12.

In case station 2 finishes the conversation first the procedure is the same as described above with reference to the case station 1 finishes the conversation first, but now the end-of-conversation signal is transmitted on $f_o$.

In case of a data call when the communication system is in the idle state (for example by station 1 in FIG. 1) the data transceiver 14 starts by transmitting a start signal. This achieves that after the receipt of this start signal by the other stations the data transceivers are activated which prevents the first information characters of a message from either not being received or received mutilated, for example owing to mechanical inertia on starting the data transceiver 14. Control device 12 is activated at the same time by means of manual control device 20 so that the modulator 9 is coupled to frequency synthetizer 5 via the change-over switch 7. The start signal, for example three bits, are thus transmitted on frequency $f_o$. On receipt of the start signal by the other stations the change-over switch 7 in those stations is locked in the position $f'_o$ by control device 12. The half-duplex data traffic from station 1 on frequency $f_o$ to all other stations may now be effected.

Termination of the data traffic is indicated by the fact that some time after the last character has been offered the data transceiver 14 inactivates itself in known manner. The VOX-network of the transmitting station will now move switch 8 to the position shown in the drawing, which causes the transmitter to be switched off. The control device 12 of the other stations detects that the transmitter no longer transmits and eliminates thereafter the locking of the change-over switch 7.

For combined data and speech communication it is possible to perform half-duplex data communication with the communication system according to the invention between a first station and all the other stations and simultaneously full-duplex speech communication between the first station and one second station, selected from the other stations. As each station comprises a first and a second receiver, each of which is tuned to the frequency belonging to the frequency pair it is possible to avoid waiting times in the communication system according to the invention. If the station would comprise only one receiver and a first station would transmit at a first frequency and receive on the second frequency, while a second station transmits on the second frequency and receives on the first frequency then all other stations receive on the first frequency. On termination of the data supply from the first station before the speech connection is broken the data supply of the second station can, however, not be transmitted because the other stations, since they receive on the first frequency, would not receive these data. The waiting time problems this might cause can be prevented by providing the station with a second receiver. The important fact is that now all stations can follow the data as well as the speech communication in full.

The speech and the data communication are separated from one another in a communication systems according to the invention. Consequently, the operation of the communication system for a combined transmission of data and speech is analogous to the operation of the system for speech only and data only. Therefore, during the transmission of data from any station, for example station 1, to all other stations, station 1 can simultaneously utilize a full-duplex speech connection to one of the other stations, for example station 2, the other stations being able to follow the conversation between stations 1 and 2. When the data traffic from station 1 to the other stations is terminated, whereas the speech communication continues, station 2 can utilize the datachannel which now becomes available for data traffic to station 1 and to all the other stations.

Figure 4:
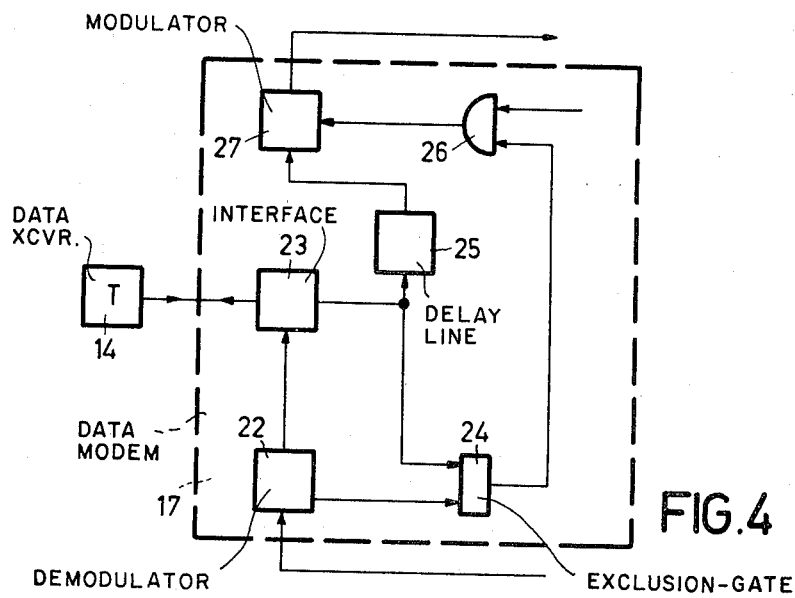
FIG. 4 shows a block diagram of a data modulator/demodulator suitable for use in a station as shown in FIG. 3.

The data modulator/demodulator 17 utilized for processing data is shown in detail in FIG. 4. The signal applied to a demodulator 22 is supplied to the data transceiver 14 through an interface 23. The data transceiver 14 is, for example, formed by a telex set on which the received information is displayed and the information to be transmitted is generated electrically and displayed.

If demodulator 22 is in operation a logic "1" is offered by the demodulator 22 to a logic EXCLUSION-gate arrangement 24. During the conversion of the signals received by demodulator 22 the interface 23 applies a logic "0" to the EXCLUSION-gate arrangement 24. As a result thereof the AND-gate 26 receives a logic "0" causing a modulator 27 to be kept or adjusted to the blocked state, as the case may be. Thus, it is prevented that, in the absence of data or on receipt of data an unmodulated subcarrier is generated, and that as a result thereof the VOX-network 21 moves switch 8 to the closed position and thereafter an unmodulated subcarrier on frequency $f_o$ or $f'_o$ is transmitted. In accordance with what is applicable for the VOX-network this is desirable, considered from the point of view of power limitation and optimum utilization of the spectrum.

On termination of the receipt of data the data demodulator 22 presents a logic "0" to the EXCLUSION-gate arrangement 24.

The transmission of data is denoted by the fact that a starting signal is generated by data transceiver 14. Interface 23 presents this signal to a delay line 25 and a logic "1" is applied at the same time to the EXCLUSION-gate arrangement 24. EXCLUSION-gate arrangement 24 now supplies a logic "1" which is applied to one of the inputs of an AND-gate 26. If one of the frequencies of the transmitter is available ($f_o$ or $f'_o$) a logic "1" is offered to the other input of the AND-gate. In that case the subcarrier of modulator 27 is switched on and can be modulated by the data and applied to filter device 16. The time delay of delay line 25 is determined by the switch-on time of the communication system. The switch-on time is mainly determined by the starting period of, for example, a telex set and is in the order of magnitude of 3 bits.

The invention is in no way limited to the embodiment shown in the Figures. Many variations and modifications of the described embodiment according to the invention wherein, however, the basic principle of the invention is used, are known to those skilled in the art and are therefore within the scope of the invention.

What is claimed is:

1. A communication system for the transmission on a telephony channel of speech signals located within a speech band as well as at least one data channel comprising data signals modulated on a sub-carrier in a data band which is located outside the speech band, the system comprising at least three stations each station comprising a transmitter and a receiver each operating on one of two mutually different frequencies—which belong to one frequency pair—for half-duplex data communication combined with full-duplex speech communication, characterized in that each station comprises a second receiver having a receive frequency which corresponds to the frequency of the transmitter of that station.

2. A communication system as claimed in claim 1, characterized in that each station comprises means for generating control signals on a service channel, modulated on a second sub-carrier frequency, located within said data band for the communication system.

3. A communication system as claimed in claim 2, characterized in that each station comprises means coupled to the transmitter and the receiver for interchanging the frequency of the transmitter between said mutually different frequencies in response to said control signals.

4. A communication system as claimed in any of the preceding claims, characterized in that the station comprises a data modulator/demodulator coupled to the transmitter and to the receivers and in that the data modulator/demodulator comprises means for keeping the modulator section thereof in the blocked state when the demodulator section is operative.

* * * * *